United States Patent [19]

Tregre

[11] Patent Number: 5,381,622
[45] Date of Patent: Jan. 17, 1995

[54] NOISE-MAKING SLIP WEIGHT DEVICE FOR FISHING

[76] Inventor: Euclid L. Tregre, 128 St. John St., Luling, La. 70070

[21] Appl. No.: 104,192

[22] Filed: Aug. 9, 1993

[51] Int. Cl.⁶ ............................................. A01K 85/00
[52] U.S. Cl. .................................... 43/42.31; 43/44.9
[58] Field of Search .................... 43/42.31, 42.36, 44.9

[56] References Cited

U.S. PATENT DOCUMENTS

| | | | |
|---|---|---|---|
| 2,741,864 | 4/1956 | Shotton | 43/42.31 |
| 3,908,298 | 9/1975 | Strader | 43/42.31 |
| 3,935,660 | 2/1976 | Plew | 43/42.31 |
| 3,987,576 | 10/1976 | Strader | 43/42.31 |
| 4,008,539 | 2/1977 | Gardner | 43/42.31 |
| 4,287,679 | 9/1981 | Klotz | 43/42.31 |
| 4,969,287 | 11/1990 | Johnson | 43/42.31 |
| 4,995,189 | 2/1991 | Crihfield | 43/44.9 |
| 5,038,513 | 8/1991 | Hardin | 43/42.31 |
| 5,144,765 | 9/1992 | Keeton | 43/42.31 |
| 5,259,151 | 11/1993 | Wicht | 43/44.9 |

*Primary Examiner*—Kurt Rowan
*Attorney, Agent, or Firm*—John R. Flanagan

[57] ABSTRACT

A noise-making slip weight device includes an elongated housing a sleeve through the center of the housing and an annular rattle element slidably mounted over and around the sleeve. The housing has a cylindrical body and a tapered nose and encloses a water tight annular interior cavity which is closed by a plug sealing off a rear end of the housing. The sleeve is integral with the plug and runs axially through the center of housing. The sleeve sealably seats in and extends through an axial passageway in the housing nose. The annular rattle element is loosely mounted on the sleeve and is sized to move freely within the annular interior cavity of the slip weight. A fishing line is threaded through the sleeve and the noise-making slip weight is assembled and ready for use.

9 Claims, 1 Drawing Sheet

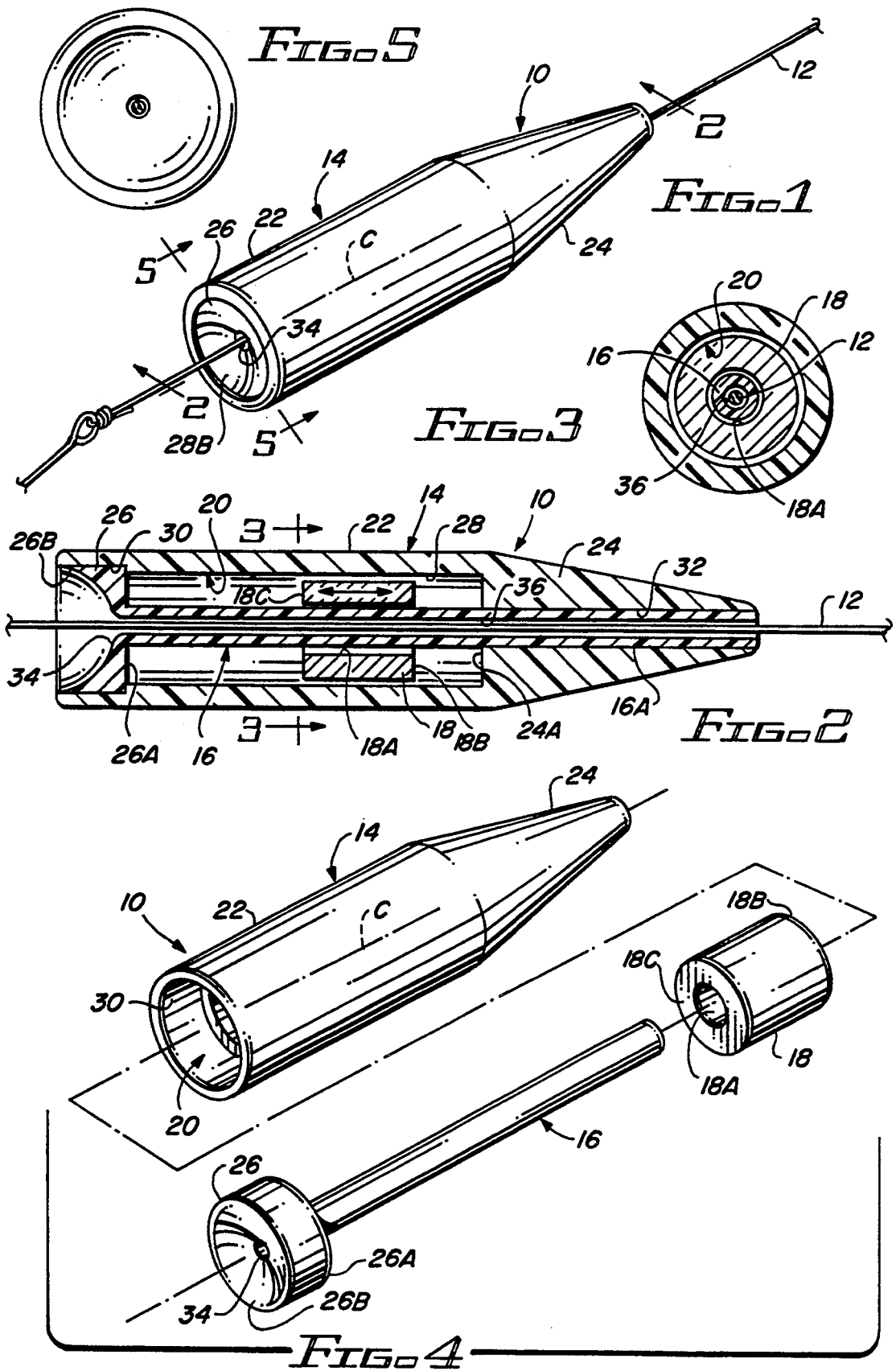

5,381,622

NOISE-MAKING SLIP WEIGHT DEVICE FOR FISHING

BACKGROUND OF THE INVENTION

1. Field of the Invention

The present invention generally relates to a fishing slip weight device of the bullet type having an internal cavity capable of slidably mounting on a fishing line and having at least one annular-shaped rattle element disposed over a center sleeve and within an internal water-tight chamber.

2. Description of the Prior Art

It has long been known by experienced freshwater sport fisherman that rattling noise-making devices attract fish and that particularly such noise making devices attract bass fish. Armed with this knowledge, sport fishing equipment suppliers have contrived various noise-making rattle devices for use by freshwater sport fishermen. These noise-making rattle devices can be divided into two basic types.

The first type of noise-making rattle device generally comprises an independent water-tight housing which contains a plurality of rattle elements. The rattle elements are usually small spheres of glass or metal. Examples of this type of rattle device are found in U.S. Pat. No. 3,935,660 issued to Plew and U.S. Pat. No. 5,038,513 issued to Hardin.

The second type of noise-making rattle device generally comprises slip weights having a partially hollow water-tight housing, an internal sleeve for slidably receiving a fishing line and a plurality of rattle elements disposed within the housing. Examples of this type of rattle device are set forth in U.S. Pat. No. 4,008,539 issued to Gardner and U.S. Pat. No. 4,969,287 issued to Johnson. Both of the noise-making slip weights disclosed in the Gardner and Johnson continue to rely on small rattle elements for noise making.

These prior art devices have drawbacks in terms of noise generation and manufacturability. They generate inadequate noise to attract fish and appear to be difficult to manufacture. Consequently, a need exists for a slip weight construction which provides a means for producing more noise and which is easier to manufacture while maintaining compactness of size.

SUMMARY OF THE INVENTION

The present invention provides a noise-making slip weight device designed to satisfy the aforementioned needs. The present invention retains the advantageous features of the prior art Gardner and Johnson patents while improving the features which are the cause of the drawbacks. The present invention thus includes a housing having a water-tight internal chamber in combination with a sleeve that runs axially through the center of the housing for receiving a fishing line. However, unlike prior art noise-making slip weight devices, the slip weight device of the present invention provides a relatively large annular-shaped rattle element which is loosely carried inside the water-tight chamber by the axial sleeve. This larger annular rattle element produces louder rattling noises which are more effective in attracting fish. Also, unlike the prior art devices, the device of the present invention is designed to be manufactured from non-toxic materials, such as brass or steel, and thus utilize no lead.

Accordingly, the present invention is directed to a noise-making slip weight device which comprises: (a) a generally elongated housing having a water-tight internal cavity; (b) a tubular sleeve disposed substantially through the center of the housing and internal cavity; and (c) at least one annular rattle element carried loosely over and along the tubular sleeve and sized to move freely within said internal water-tight cavity in order to impact with a portion of the housing and thereby generate a rattling noise.

More particularly, the slip weight device also comprises a cylindrical plug which sealably seats in an opening in a rear end of the housing. The plug has an axial orifice and is integrally connected to a rear end of the tubular sleeve. The sleeve extends coaxially along the central axis of the housing and sealably fits within a bore in a tapered end of the housing to thereby form in conjunction with the plug a water-tight annular chamber in the cavity of the housing in which is disposed the annular rattle element.

These and other features and advantages of the present invention will become apparent to those skilled in the art upon a reading of the following detailed description when taken in conjunction with the drawings wherein there is shown and described and illustrative embodiment of the invention.

BRIEF DESCRIPTION OF THE DRAWINGS

In the following detailed description, reference is made to the attached drawings in which:

FIG. 1 is a perspective view of the noise-making slip weight device shown mounted on a fishing line.

FIG. 2 is a longitudinal sectional view of the slip weight device taken along line 2—2 of FIG. 1.

FIG. 3 is an enlarged cross-sectional view of the slip weight device taken along line 3—3 of FIG. 2.

FIG. 4 is an exploded perspective view of the slip weight device of FIG. 1.

FIG. 5 is an enlarged rear elevational view of the slip weight device as seen along line 5—5 of FIG. 1.

DETAILED DESCRIPTION OF THE INVENTION

Referring to the drawings, and particularly to FIG. 1, there is illustrated a noise-making slip weight device of the present invention, generally designated 10. The slip weight device 10 is shown slidably mounted on a fishing line 12.

Referring now to FIGS. 1-5, the slip weight device 10 basically includes an elongated housing 14, an elongated tubular sleeve 16, and at least one annular rattle element 18. The elongated housing 14 defines a water-tight internal cavity 20 which constitutes a sound chamber. The tubular sleeve 16 is disposed through substantially the longitudinal centerline C of the housing 14 and through the internal cavity 20 therein. The annular rattle element 18 is carried over and about the tubular sleeve 16 and is sized relative to the cavity 20 and sleeve 16 so as to movable freely within the water-tight cavity 20 and along the sleeve 16 between the opposite ends of the housing 14. The annular rattle element 18 is thereby capable of reciprocally moving between and repeatably impacting opposite ends of the housing 14 so as to generate a rattling noise. Also, the annular rattle element 18 is capable of moving from side to side so that it can strike the wall of the housing 14. The housing 14, sleeve 16 and annular rattle element 18 are preferably made of a suitable non-toxic metal, such as brass or steel. The housing 14, sleeve 16 and annular rattle 18 can be provided in various lengths and diameter sizes to accommodate different fishing depths and methods.

More particularly, the elongated housing 14 has a main body 22, a forward tapered nose 24 and a rear plug 26. The main body 22 is cylindrical in shape and defines and encompasses the internal cavity 20 such that the cavity 20 also has a cylindrical shape. The internal cavity 20 includes a forward cylindrical rattle chamber 28 and a rear cylindrical plug recess 30. The cylindrical plug recess 30 has a larger diameter than the forward cylindrical rattle chamber 28. The tapered nose 24 has an elongated axial bore 32 which extends between and is open at the front end of the nose 24 and the forward cylindrical rattle chamber 28.

Referring to FIGS. 1, 2, 4 and 5, the rear plug 26 is of a size adapted to snugly fit within the rear plug recess 30 of the main body 22. The plug 26 has a cylindrical configuration and includes a forward surface 26A, a rearward surface 26B and an axial orifice 34 extending between and interconnecting the forward and rearward surfaces 26A, 26B. The forward surface 26A of the rear plug 26 is substantially planar in shape, whereas the rearward surface 26B of the plug 26 is of concave shape.

As shown in FIGS. 2 and 4, the sleeve 16 and plug 26 are integrally connected to one another such that the sleeve 16 extends coaxially with the longitudinal centerline C of the main body 22 from the forward surface 26A of the plug 26. The axial orifice 34 of the plug 26 is connected in communication with an axial passageway 36 of the sleeve 16. A forward portion 16A of the tubular sleeve 16 is of a size adapting it to snugly fit within the elongated axial bore 32 of the tapered nose 24. As illustrated in FIG. 2, therefore, the fishing line 12 can be threaded through the plug 26 and sleeve 16 via their axial orifice 34 and passageway 36. Thus, the plug 26 and sleeve 16 are integrally connected together and fit within the housing 14 so that they can respectively sealably seat in the plug recess 30 and the axial bore 32 of the nose 24 and thereby seal the water-tight rattle chamber 28.

The one annular rattle element 18 has a central opening 18A adapting it to be carried loosely by the sleeve 16 inside of the rattle cavity 20. More than one annular rattle element 18 can be utilized. To assemble the slip weight device 10, the annular rattle element 18 is first mounted on the sleeve 16, then the plug 26 and the sleeve 16 together with the rattle element 18 are inserted in and sealably mated with the housing 14. The fishing line 12 is then threaded through the sleeve 16 and the slip weight device 10 is finally ready for use. The housing 14 defines an interior surface 24A on a rear end of the forward tapered nose 24 of the housing which forms a forward end of the cylindrical internal cavity 20 extending substantially transverse to the longitudinal centerline C of the housing 14. The forward surface 26A of the rear plug 26 forms a rearward end of the cylindrical internal cavity 20 extending substantially transverse to the longitudinal centerline C of the housing 14 and parallel to the forward end of internal cavity 20. The rear plug 26 has an axial length extending between the forward and rearward surfaces 26A, 26B thereof thereof being substantially less than the axial depth of the internal cavity 20 extending between the forward and rearward ends thereof. The annular rattle element 18 has a pair of opposite forward and rearward ends 18B, 18C defining surfaces extending substantially transverse to the longitudinal centerline C of the housing 14 and parallel to the forward and rearward ends 24A, 26A of the internal cavity 20 in the housing 14 so as to create impacts therewith and thereby generate noise upon movement of the annular rattle element 18 along the sleeve 16.

The relatively large annular rattle element 18 is well adapted for producing loud rattling noises. Furthermore, the concave-shaped rearward surface 26B of the plug 26 allows the slip weight device 10 to be combined with a fishing lure which, in turn, can vibrate the slip weight device 10 as the fishing lure and slip weight device 10 are pulled through the water. These vibrations augment the noise-making function of the annular rattle element 18. Further, the concave shape of the rearward surface 26B can serve to facilitate the delicate operation of threading the fishing line 12 through the plug 26 and into sleeve 16. However, it should be readily apparent that the line 12 can be inserted from either end. Also, it be readily apparent to those skilled in the art, that the slip weight device 10, when assembled, must have a specific weight greater than the quantity of water it displaces in order to function. It should also be apparent to those skilled in the art that the dimensions and the materials of the various elements of this device could be varied to produce slip weight devices of various sizes and weights.

It is thought that the present invention and its advantages will be understood from the foregoing description and it will be apparent that various changes may be made thereto without departing from the spirit and scope of the invention or sacrificing all of its material advantages, the form hereinbefore described being merely a preferred or exemplary embodiment thereof.

I claim:

1. A noise-making slip weight device, comprising:

(a) an elongated housing having a main body and a forward tapered nose extending along a longitudinal centerline of said housing, said main body defining a substantially cylindrical water-tight internal cavity and said tapered nose defining an axial bore extending from said internal cavity to the exterior of said housing at a front end of said forward tapered nose, said axial bore being smaller in diameter than said internal cavity, said housing defining an interior surface on a rear end of said forward tapered nose forming a forward end of said cylindrical internal cavity extending substantially transverse to said longitudinal centerline of said housing;

(b) a plug spaced axially rearwardly from said forward tapered nose and disposed in said housing and sealing said cylindrical internal cavity of said housing from entry by water, said plug having a forward surface forming a rearward end of said cylindrical internal cavity extending substantially transverse to said longitudinal centerline of said housing and substantially parallel to said forward end of said cylindrical internal cavity, said plug also having a rearward surface spaced from said forward surface and an axial orifice defined in said plug and extending between and interconnecting said forward and rearward surfaces thereof, said plug having an axial length extending between said forward and rearward surfaces thereof being substantially less than the axial depth of said internal cavity extending between said forward and rearward ends thereof;

(c) a tubular sleeve disposed substantially along said longitudinal centerline of said housing and extending through said internal cavity of said main body thereof and through said axial bore of said forward tapered nose thereof, said sleeve being connected to said plug and having a passageway extending longitudinally therethrough from said axial orifice of said plug to the exterior of said forward tapered nose for receiving a fishing line therethrough; and (d) at least one annular rattle element carried over and around said tubular sleeve and being sized to move freely along said sleeve and within said internal water-tight cavity, said annular rattle element having a cylindrical shape and a pair of opposite forward and rearward ends defining surfaces extending substantially transverse to said longitudinal centerline of said housing and substantially parallel to said forward and rearward ends of said internal cavity in said housing so as to create impacts therewith and thereby generate noise upon movement of said annular rattle element along said sleeve.

2. The device as recited in claim 1 wherein said plug is integral with said sleeve.

3. The device as recited in claim 1 wherein said annular rattle element has a central hole receiving said sleeve therethrough and adapting said rattle element to loosely fit over said sleeve, said rattle element also adapted to loosely fit within said internal cavity of said housing and move freely therein.

4. The device as recited in claim 1 wherein said rattle element has a specific gravity greater than a volume of water displaced by said rattle element.

5. The device as recited in claim 1 wherein said axial bore of said forward tapered nose snugly receives said sleeve.

6. The device as recited in claim 5 wherein said internal cavity of said main body has a forward cylindrical rattle chamber and a rearward cylindrical plug recess having a larger diameter than said forward cylindrical rattle chamber.

7. The device as recited in claim 6 wherein said plug has a cylindrical configuration and is sized to snugly fit within said rearward plug recess of said main body.

8. The device as recited in claim 1 wherein said rearward surface of said plug is concave-shaped.

9. The device as recited in claim 1 wherein said tubular sleeve is integral with and extends forwardly from said forward surface of said cylindrical plug.

* * * * *